April 11, 1967  W. E. BLEINBERGER ETAL  3,313,874
METHODS OF MAKING PLASTIC TERMINAL BLOCK Filed Sept. 11, 1963  2 Sheets-Sheet 1

INVENTORS
W. E. BLEINBERGER
H. LEHNEIS
BY
ATTORNEY

April 11, 1967 W. E. BLEINBERGER ETAL 3,313,874
METHODS OF MAKING PLASTIC TERMINAL BLOCK
Filed Sept. 11, 1963 2 Sheets-Sheet 2

United States Patent Office 3,313,874
Patented Apr. 11, 1967

3,313,874
METHODS OF MAKING PLASTIC TERMINAL BLOCKS
Warren E. Bleinberger, Towson, and Horace Lehneis, Catonsville, Md., assignors to Western Electric Company, Incorporated, New York, N.Y., a corporation of New York
Filed Sept. 11, 1963, Ser. No. 308,257
3 Claims. (Cl. 264—250)

This invention relates to methods of making terminal blocks. More particularly, this invention relates to methods of making plastic terminal blocks having outer shells of thermoplastic material filled with thermosetting material.

Plastic terminal blocks of the prior art have been made by forming a thermoplastic shell, mounting electrically conductive terminals in the shell at predetermined positions, and then filling the shell with a thermosetting material which is thereafter set. (See F. A. Schultz Patent 2,685,107 and L. W. Kelsay Patent 2,787,652.) This prior art technique enables the fabrication of terminal blocks without stripping the blocks from molds and subjecting the blocks to possible damage in stripping them from the molds.

However, in using such plastic terminal blocks to interconnect a plurality of conductors, it is frequently necessary to solder the conductors to the terminals of blocks, especially when the interconnections require frequent changes. In order to make solder connections, a heat-resistant surface adjacent the terminals to which conductors are soldered is required. One reason for this requirement is that heat used to solder the conductors to the terminals may score the surface of the terminal block and produce indentations therein. Moreover, dust, insect webs and moisture frequently collects in these indentations, causing electrical leakage between the terminals of the block. Such leakage often produces undesirable and annoying crosstalk among a plurality of telephone circuits connected to the terminals of the block.

Moreover, in making the plastic terminal blocks having thermoplastic shells filled with a thermosetting material, the elimination of grinding operations greatly reduces the cost of manufacturing the blocks. The elimination of grinding operations can result from using the plastic shell in conjunction with a separate thermoplastic top or cap for the shell. This cap is positioned on the shell after it is filled with the thermosetting material. But the cap must be maintained level with respect to the shell and the block and must be locked tightly to the block, if the grinding operations are to be eliminated.

It is, therefore, an object of this invention to provide new and improved methods of making plastic terminal blocks.

Another object of the invention is to provide a method of making a plastic terminal block having a thermoplastic shell and a thermosetting plastic block bonded to the shell with a side of the block exposed and adjacent a plurality of terminals extending from the block, whereby such side of the block provides a heat resistant surface for soldering electrical conductors to the terminals.

A further object of this invention is the provision of a method of making a terminal block having a thermoplastic shell and a thermosetting plastic material cast within the shell and exposed at one side of the shell for fixedly mounting electrically conductive terminals with one end thereof for wire wrapping extending beyond the thermoplastic shell and with the other end for soldering extending beyond the exposed thermosetting block.

A still further object of the invention is to provide a method of making the plastic terminal block, wherein a thermoplastic cover or cap is positioned on an open top of a thermoplastic shell filled with free-flowing thermosetting material to force such thermosetting material up through a plurality of frusto-conically shaped apertures having their bases in the upper surface of the cover to indicate that the shell is completely filled and for locking the cap onto the shell when the thermosetting material sets.

With these and other objects in view, the present invention contemplates a method of making plastic terminal blocks having a thermoplastic support with a thermosetting plastic block cast against and bonded to one side of the support. At least one electrically conductive terminal is mounted within and extends through and beyond the block and the support.

Additionally, the present invention contemplates a method of making plastic terminal blocks which includes forming a thermoplastic shell having an open end and an adjacent open side, and forming a thermoplastic cover for the open end of the shell. The open side of the shell is positioned against a supporting plate and then a plurality of terminals are inserted through the shell and through the supporting plate. Next, the space between the shell and the plate is filled through the open end with a thermosetting plastic compound; whereupon, the thermoplastic cover is positioned over this end of the shell. The thermosetting plastic compound is then set and the supporting plate is removed leaving a fabricated plastic terminal block.

Other objects and advantages of the invention will be more clearly understood by reference to the following description and the accompanying drawings, wherein.

Figures 3, 4:
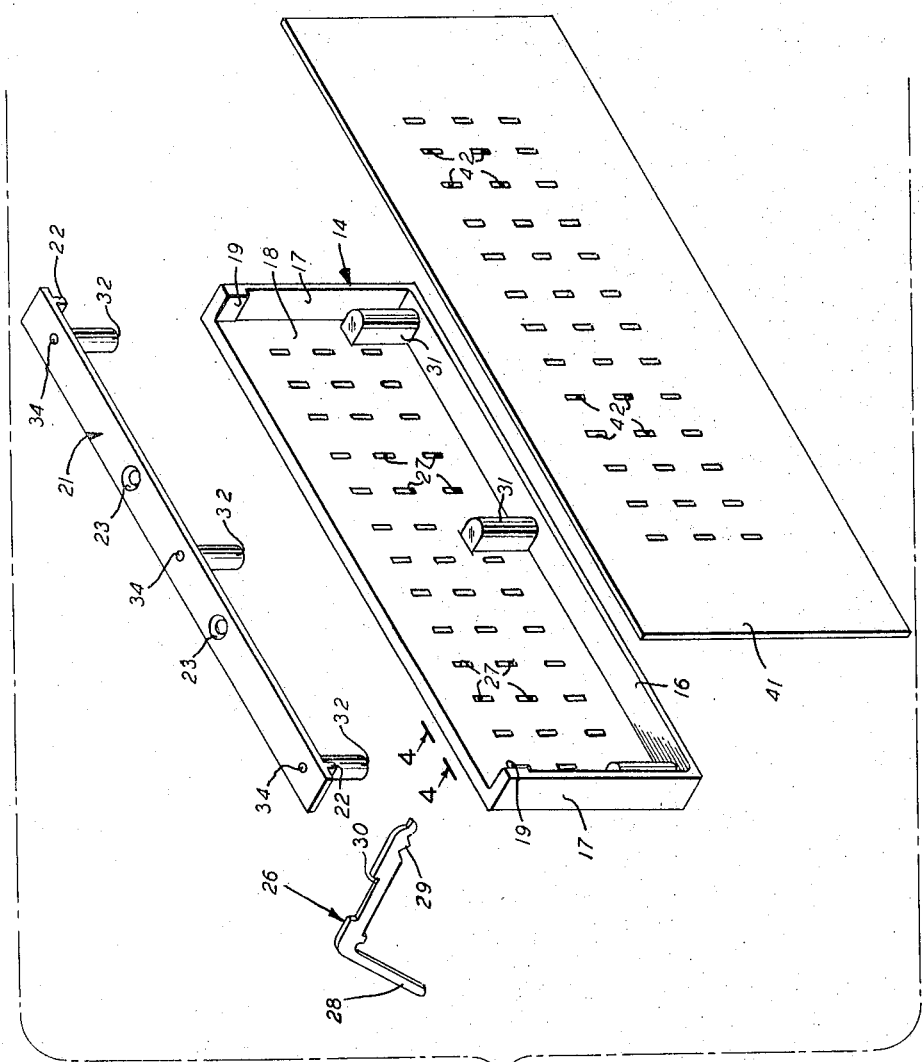

FIG. 3 is an exploded perspective view of an assembly of the terminal block, showing the manner in which a metallic supporting plate is positioned against an open end of the plastic shell of the terminal block and a thermoplastic cover or cap is positioned on top of another open end of the shell; and FIG. 4 is a fragmentary side-elevational view taken along lines 4—4 of FIG. 3, showing a tapered aperture into which an electrically conductive terminal is inserted prior to the filling of the plastic shell with a thermosetting material.

Figure 1:
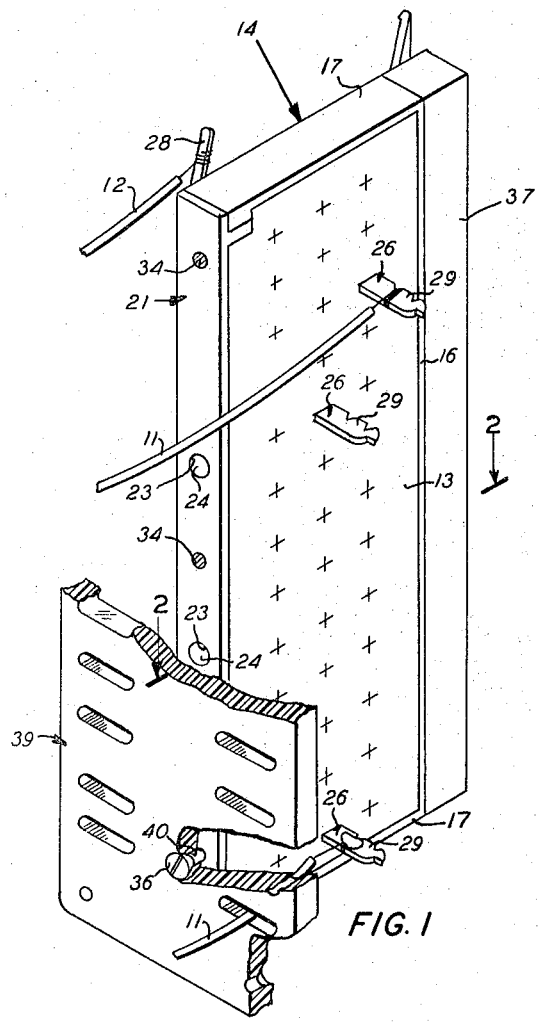
FIG. 1 is a perspective view of a plastic terminal block, clearly showing the manner in which a terminal guard and a combination fanning strip-mounting plate are connected to the block.
Figure 2:
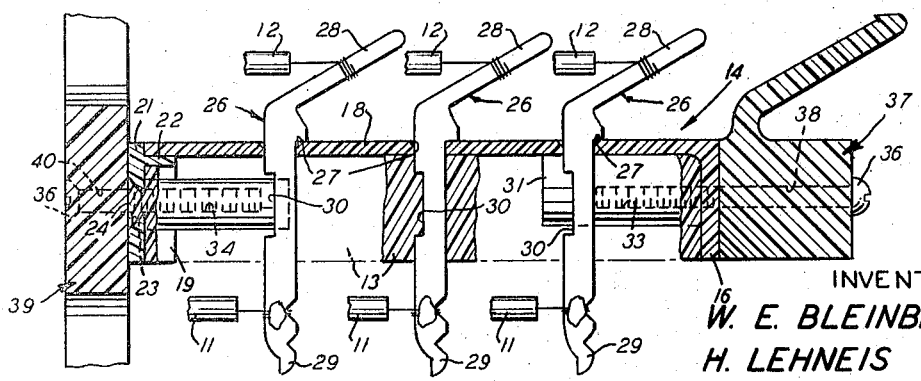
FIG. 2 is a cross-sectional view taken along lines 2—2 of FIG. 1, illustrating the manner in which one conductor is soldered to a terminal of the block which is adjacent a thermosetting heat resistant surface of the block, while another conductor is wire-wrapped on the end of the terminal adjacent the thermoplastic shell.

Referring now to the drawings, and more particularly to FIGS. 1 and 2, there is shown a plastic terminal block for interconnecting each conductor 11 of a first group of electrical conductors to each conductor 12 of a second group of electrical conductors. The terminal block includes an integral plastic insulating core or block 13 having the configuration of a rectangular parallelepiped and composed of a thermosetting compound, such as polyester resin.

Autogenously bonded to the thermosetting block 13 is an integral plastic insulating support or shell, designated generally by the numeral 14, composed of a thermoplastic compound, such as a styrene copolymer, having a softening temperature higher than the curing temperature of the thermosetting block 13. The shell 14 includes a base 16, FIGS. 1–3, a pair of parallel ends 17—17 and a side 18. Integral with the shell 14 are a pair of sidewise protruding portions 19—19 extending inwardly within the shell 14 at the edges of the ends 17 opposite the base 16 of the shell 14.

A thermoplastic cover, top or cap, designated generally by the numeral 21, having the configuration of a rectangular parallelepiped is fixed to the shell 14, parallelling the base 16 of such shell 14. In fixing the cap 21 to the shell 14, a locating rib 22 spaced from each end of the cap 21 and projecting perpendicularly from the lower surface of such cap 21 engages the side 18 of the shell 14 and the sidewise protruding portions 19—19 of the shell 14.

In addition, the cap 21 includes a plurality of frusto-conical vents or apertures 23—23 having their bases on the exterior surface of the cap 21. In other words, the apertures 23—23 taper inwardly from the exterior surface to the interior surface of the cap 21. Formed within the apertures 23—23 is a plurality of tapered projections 24, FIG. 2, corresponding to the frusto-conical shape of such apertures 23 and flush with the upper surface of the cap 21. The projections 24 are composed of the same thermosetting plastic material as the block 13 and are integral with such block 13, thereby locking the cap 21 onto the block 13 and shell 14, and maintaining the locating rib 22 in contact with the sidewise protruding portion 19 of the shell 14.

A plurality of spaced electrically conductive terminals, generally designated by the numeral 26, FIGS. 2 and 3 are positioned within a plurality of tapered apertures 27, FIGS. 2, 3 and 4, having rectilinear cross sections and are fixedly mounted within the thermosetting block 13. Each terminal 26 includes an end 28 for wrapping each conductor 12 thereon. Each end 28 extends beyond the side 18 of the thermoplastic shell 14. Moreover, each terminal 26 includes another end 29 opposite the end 28 for soldering each conductor 11 thereto. Each terminal 26 also includes a cut-out portion 30 to aid in locking each terminal 26 to the block 13.

The reason the conductors 12 are wire wrapped to the end 28 and the conductors 11 are soldered to the end 29 is that, in a telephone central office employing conductor-interconnecting devices, frequently a predetermined portion of the connections of the conductors to terminals are substantially permanent and therefore are solderlessly wrapped very tightly to the terminals; whereas, about the same number of connections of the conductors to terminals are temporary and are therefore soldered. The wire-wrapping frequently used in central offices is usually more suited for permanent connections, while soldering is more suited for connections requiring frequent changes.

With the terminal block of the present invention, the side of the thermosetting block 13 adjacent the soldered conductors 11 provides a heat resistant surface. Therefore, if a soldering device, in soldering the conductors 11 to the ends 29 of the terminals 26, slips and comes into contact with the terminal thermosetting block 13, no scoring of the block 13 by the soldering device will occur. Consequently, no indentations will result in the block 13 in which dust and moisture can collect, thereby eliminating a possibility of electrical leaks betwen terminals and resulting crosstalk between telephone circuits.

Moreover, the conductors 12 are wrapped about the ends 28 of the terminals 26 and therefore do not require a heat resistant surface. Consequently, the thermoplastic side 18 of the shell 14 is adjacent to the wire-wrapped ends 28 of the terminals 26.

Formed on and integral with the base 16 and the side 18 of the shell 14 are a plurality of elongated thermoplastic members 31. Moreover, another plurality of elongated thermoplastic members 32 are formed on and integral with the thermoplastic cap 21. These elongated thermoplastic members 31 and 32 each include longitudinal passageways 33 and 34 (FIGS. 2 and 3) for receiving conventional self-tapping threaded members 36 which are slightly larger in diameter than the passageways 33 and 34. These threaded members 36 are used to removably attach the thermoplastic shell 14 to a terminal guard 37 by positioning such members 36 through apertures 38 provided in the terminal guard 37 and then threading the members 36 through the passageways 33 into the thermoplastic elongated members 31. Also, the threaded members 36 are used to removably attach a combination fanning strip-mounting plate 39 to the thermoplastic cap 21 by positioning such threaded members 36 through apertures 40 (FIG. 1) provided in the strip-plate 39 and then threading the members 36 through the longitudinal passageways 34 into the thermoplastic members 32. Since the threaded members 36 are self-tapping and the thermoplastic members 31 and 32 are relatively soft, it is very easy to rotate the threaded members 36 in the pasageways 33 and 34 to mount the shell 14 to the terminal guard 37 and to mount the strip-plate 39 to the cap 21. Moreover, the thermoplastic material, of which the elongated members 31 and 32 are formed, is subject to such an insubstantial amount of cold-flow that the threaded members 36 maintain the shell 14 tightly mounted to the terminal guard 37 and maintain the strip-plate 39 tightly mounted to the cap 21.

In making the plastic terminal block of the present invention, the shell 14, having the sidewise protruding portions 19 and the elongated members 31, is formed from a thermoplastic material, such as a styrene copolymer, by any of the conventional molding or casting techniques of the prior art into the configuration shown in FIG. 3. This shell 14 has an open side and an adjacent open top. Moreover, the cap 21, having the frusto-conically shaped apertures 23 therein, the locating rib 22 thereon, and the elongated members 32 thereon is similarly formed of a thermoplastic material, such as a styrene copolymer. In forming the shell 14 and the cap 21, core pins are used to form the required apertures 23 and passageways 33 and 34. Such core pins may be accurately positioned in the shell 14 and cap 21 before they set, and after the shell 14 and cap 21 set, the core pins may be very easily removed. The ease of removal results from the lack of shrinkage of the thermoplastic material of the shell 14 and cap 21. Moreover, due to the lack of shrinkage, the core pin spacing remains unchanged during the setting, thereby accurately maintaining the spacing of the apertures 23 and passageways 33 and 34.

Next, the open side of the shell 14 is positioned and held against a metallic supporting plate 41 having tapered apertures 42 for receiving the terminal 26. After such positioning of the plate, the terminals 26 are inserted first through the tapered apertures 27 in the side 18 of the shell 14 and then through the apertures 42 in the plate 41, resulting in the holding of the terminals 26 in a predetermined space relationship. While the terminals 26 are so held, a free-flowing thermosetting molding material, such as a polystyrene resin, curable at a temperature lower than the melting temperature of the shell 14 is poured through the open top of the shell 14 to fill the entire shell 14. The cap 21 is then positioned over the open top of the shell 14 to engage the rib 22 with the sidewise portions 19. Such engagement aids in maintaining the cap 21 level or parallel with the base 16, even after the thermosetting material sets and shrinks. The positioning of the cap 21 on the shell 14 forces some of the free-flowing molding material up through the apertures 23 in the cap 21 to indicate that the entire internal portion of the shell 14 is filled with the molding material. Then, a straight-edged wiper or a squeegee is brought into contact with the upper surface of the cap 21 and is moved across such surface to remove any excess molding material from this surface and to form a smooth upper surface on the molding material flush with the upper surface of the cap 21.

Next, the entire assembly is subjected to a low heat to cure the thermosetting molding material and to soften the inside surface of the shell 14 to set or harden such molding material and to autogenously bond the thermosetting molding material forming the block 13 to the shell 14. This bond results in an integral unit or plastic terminal block, since both the thermosetting material of the block 13 and the thermoplastic shell 14 have an affinity for each other. Moreover, as the thermosetting material hardens, it shrinks, thereby locking the terminals 26 in the block 13 and aiding the projections 24 in locking the cap 21 to the shell 14.

Using the shell 14 as a mold and as a constituent of the ultimate terminal block obviates the need for a separate steel mold and therefore eliminates the stripping of the terminal block from a mold and reduces the possibility of damaging the block in stripping it from such steel mold. Additionally, the use of the shell 14 as a mold enables the positioning of the plastic terminal block perpendicular to the terminal guard 37 and the strip-plate 39 with a high degree of right-angular accuracy without a preliminary grinding of the contacting surfaces of the terminal block, since the shell 14 is pre-cast with a high degree of right-angular accuracy. This elimination of a grinding operation reduces the manufacturing cost of the terminal block.

Moreover, the use of a pre-cast shell 14 having elongated members 31 and a pre-cast cap 21 having elongated members 32 with longitudinal passageways 33 and 34, respectively, therein eliminates the need for a drilling operation in the termianl block for the threaded members 36 or, in the alternative, eliminates the use of core pins in the molding of the block 13 within the shell 14. This also reduces manufacturing costs.

It is to be understood that the above-identified embodiments of the invention are merely illustrative and that numerous modifications may be made within the spirit and scope of this invention.

What is claimed is:

1. A method of making a terminal block comprising the steps of:
   forming a thermoplastic shell having an open side and an adjacent open end,
   positioning the open side of the shell against a supporting plate,
   inserting a plurality of terminals at predetermined positions through the shell and through the supporting plate,
   filling the space between the shell and the plate through the open end of the shell with a thermosetting plastic compound,
   positioning the thermoplastic cover over said open end of the shell,
   setting the thermosetting compound, and
   removing the plate.

2. The method of making a terminal block comprising the successive steps of:
   molding a thermoplastic shell having first and second open adjacent sides and having a plurality of apertures opposite the first open side;
   molding a thermoplastic cap with a plurality of frusto-conical vents having their bases on the exterior surface of the cap;
   positioning a metallic plate with apertures therein on the first open side of the shell to close said side and to align the apertures in the plate with the apertures in the shell;
   inserting a plurality of electrically conductive terminals in said apertures in both the shell and the plate to extend said terminals beyond the shell and the plate;
   filling the space between the shell and the plate with a free-flowing thermosetting plastic compound;
   assembling the cap on the second open side of the shell to close said second open side and to force said free-flowing compound up through said vents;
   removing any excess free-flowing compound from the exterior surface of the cap;
   curing the thermosetting plastic compound; and
   removing the metallic plate from the shell, the cured thermosetting plastic compound and the terminals.

3. The method of making a plastic terminal block comprising the steps of:
   forming a styrene copolymer plastic material into a shell having a rectangular parallelepiped configuration and having an open side and an open top adjacent said open side,
   positioning the open side of the shell against a metallic supporting plate,
   mounting a plurality of electrically conductive terminals at predetermined positions through the shell and through the supporting plate,
   pouring through the open top of the shell a free-flowing thermosetting polyester resin molding material curable at a temperature lower than the melting temperature of the shell to fill the entire shell with such material,
   forming a styrene copolymer plastic material into a covering having a plurality of apertures tapered inwardly from the upper surface of the cover to the lower surface thereof,
   positioning the cover over the open top of the shell to force a portion of the molding material up through the apertures in the cover,
   moving a straight edged wiper across the upper surface of the cover to remove any excess molding material from such upper surface and to form a smooth surface of molding material in the apertures of the cover flush with the upper surface thereof,
   setting the molding material in the shell and apertures of the cover to autogenously bond the shell to the molding material to form an integral unit, and
   removing the supporting plate from the shell and the set-molding material.

References Cited by the Examiner

UNITED STATES PATENTS

| | | | |
|---|---|---|---|
| 2,685,107 | 8/1954 | Schultz | 264—263 |
| 2,787,652 | 4/1957 | Kelsay | 174—76 |
| 2,885,651 | 5/1959 | Moeller. | |
| 2,903,738 | 9/1959 | Moeller. | |
| 2,988,773 | 6/1961 | Logan. | |
| 3,154,631 | 10/1964 | Mauviel | 264—272 X |
| 3,194,867 | 7/1965 | Shannon | 264—263 X |

ROBERT F. WHITE, *Primary Examiner.*

L. S. SQUIRES, T. J. CARVIS, *Assistant Examiners.*